July 28, 1942. J. R. SENSIBAR 2,291,109
EXPANSION JOINT
Filed Nov. 8, 1939 4 Sheets-Sheet 3
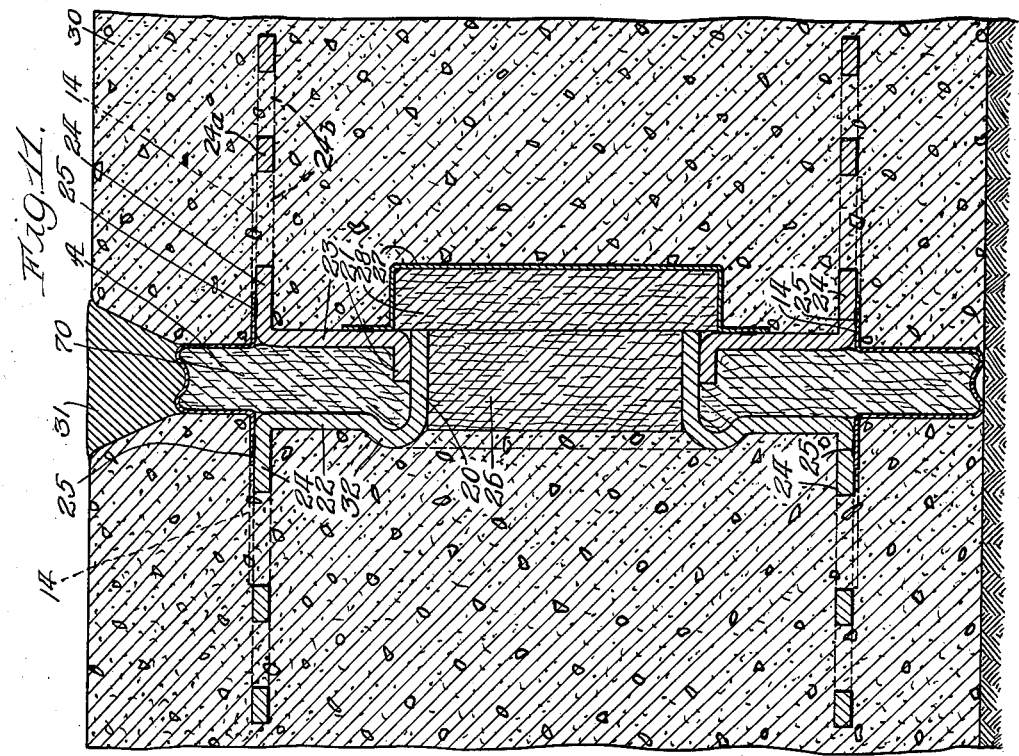
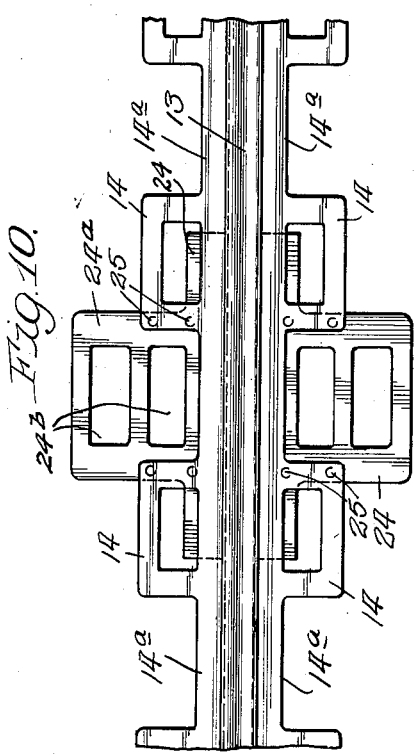
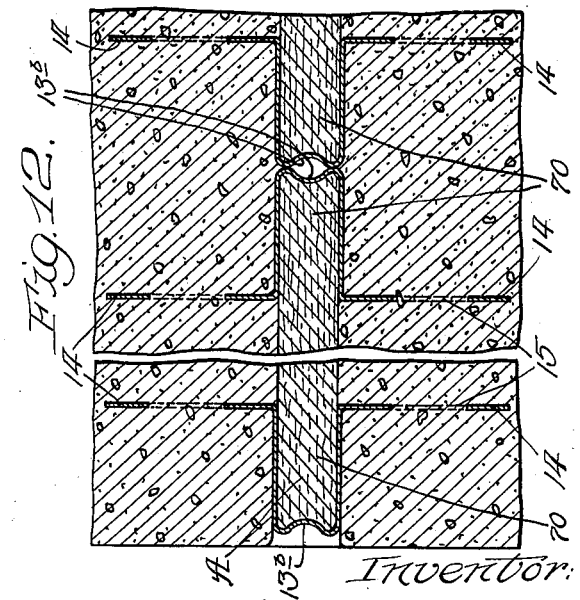
Inventor:
Jacob R. Sensibar,
By Christon, Wiles, Davis, Hiroshl; Dawson,
Attys.

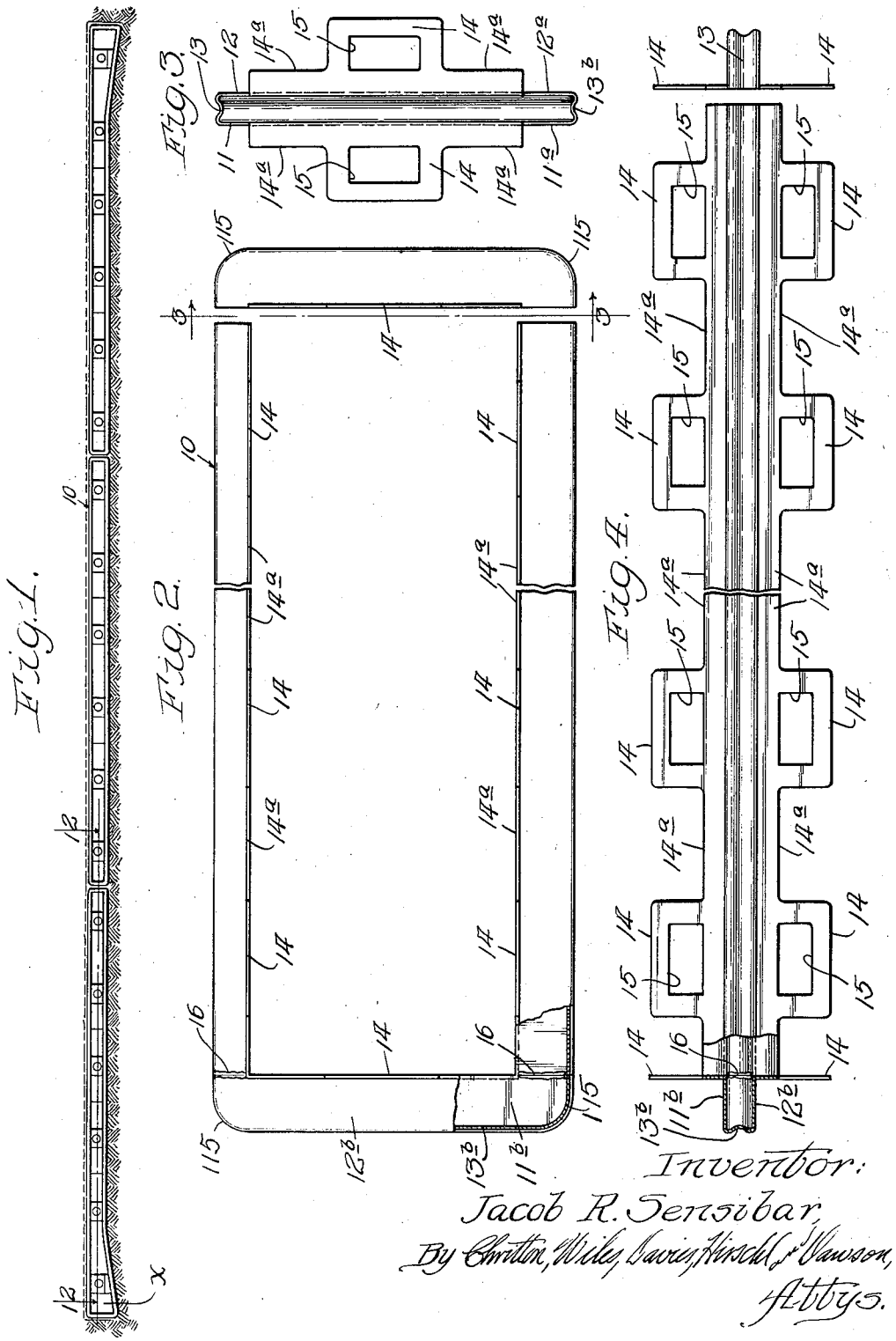

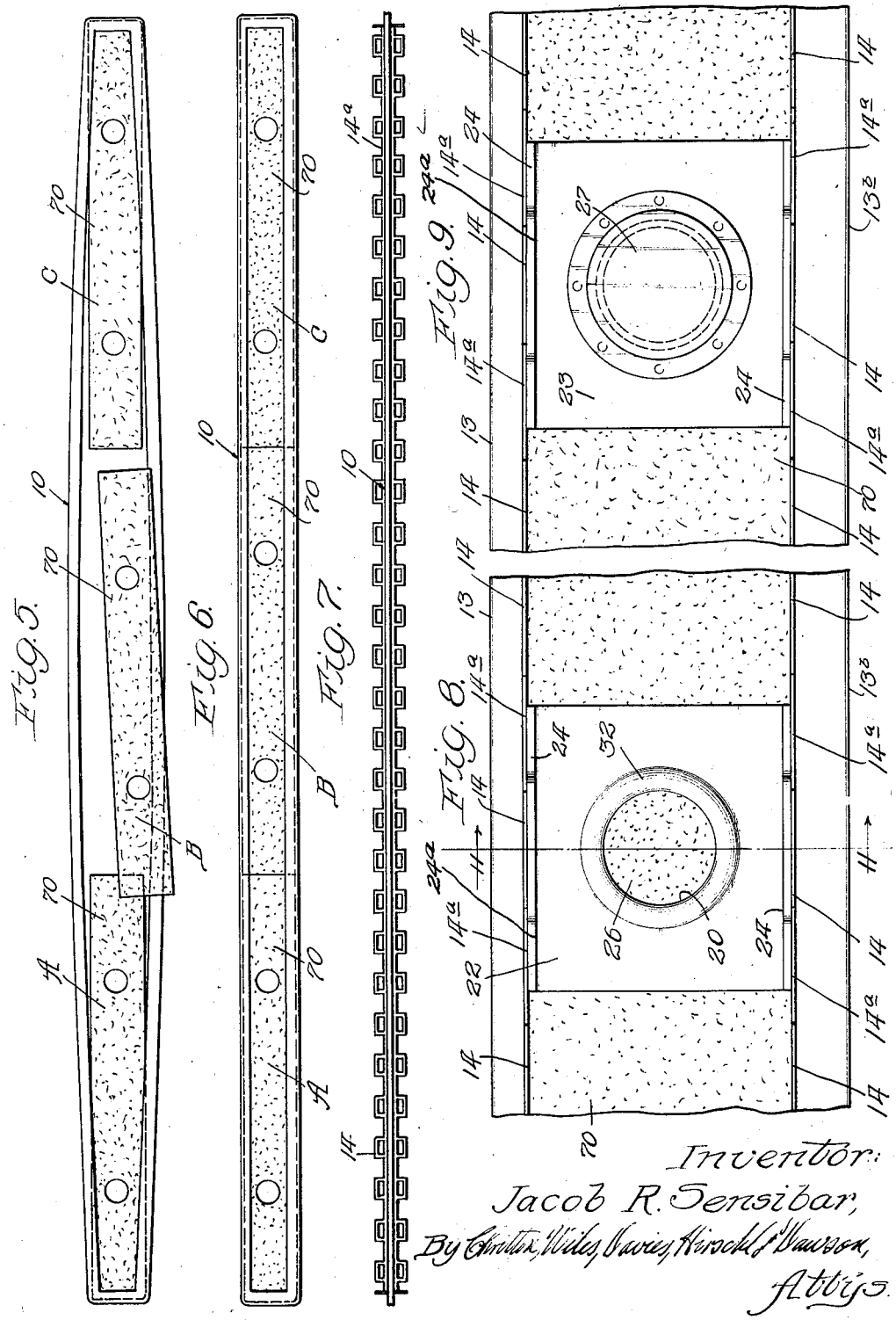

July 28, 1942.　　　J. R. SENSIBAR　　　2,291,109
EXPANSION JOINT
Filed Nov. 8, 1939　　　4 Sheets-Sheet 4
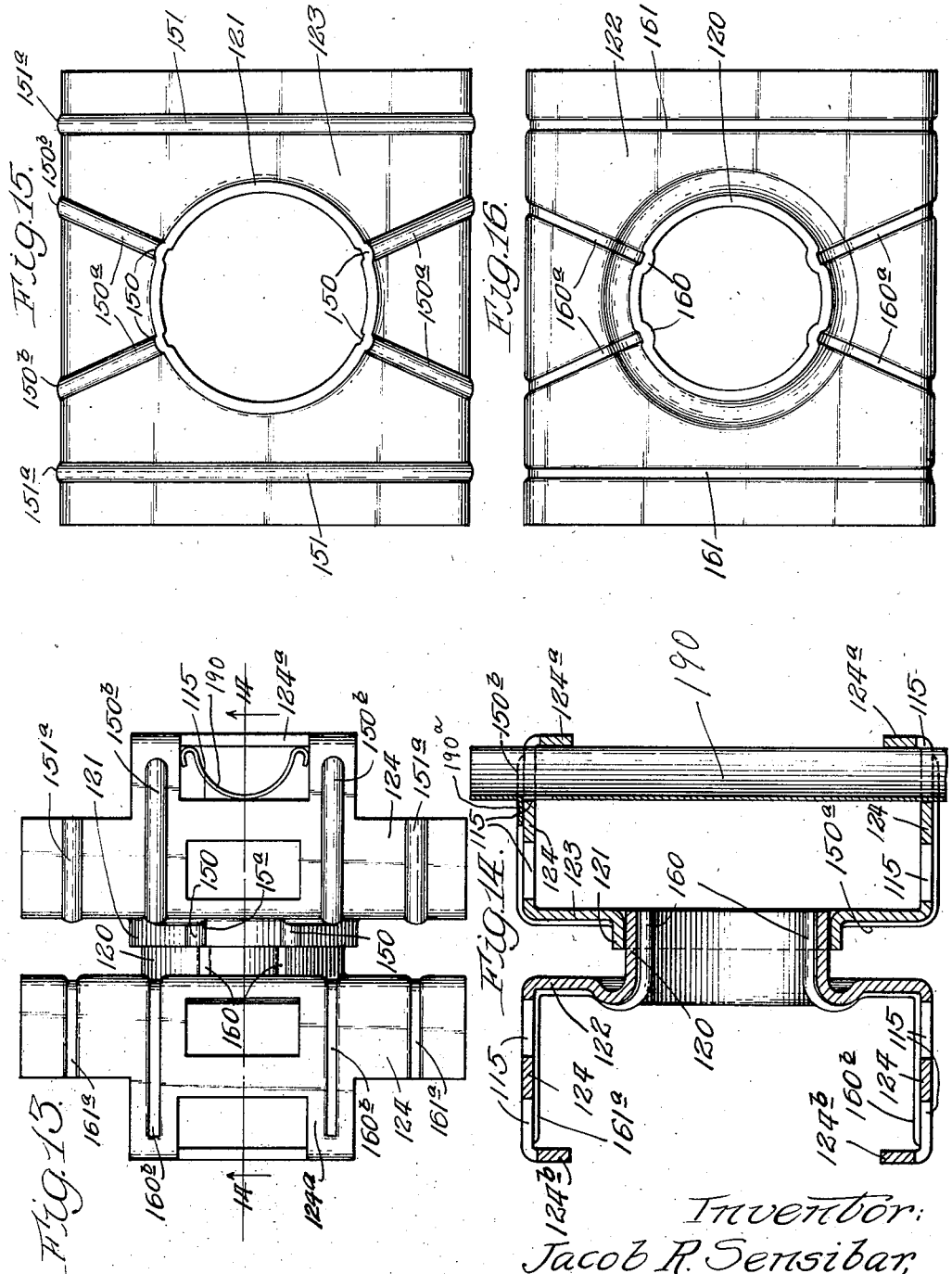
Inventor:
Jacob R. Sensibar Patented July 28, 1942

2,291,109

UNITED STATES PATENT OFFICE 2,291,109

EXPANSION JOINT

Jacob R. Sensibar, Chicago, Ill.

Application November 8, 1939, Serial No. 303,473

10 Claims. (Cl. 94—18)

This invention relates to improvements in expansion joints, and more especially a transverse joint especially adapted for use in cement or concrete highways, pavements and the like.

Among the features of my invention, is the provision of a joint which is strong, rugged, and efficient in operation.

Another feature of my invention is the provision of a transverse joint providing space for the expansion and contraction of the adjacent slabs and forming a permanent seal against the entry of water, silt, stones, and other extraneous material from the top, bottom and edges.

Another feature of my invention is the provision of a joint adapted to maintain equal deflections of the slabs adjacent the sides of the joint by means of suitable and structural shear elements set and maintained accurately perpendicular to the longitudinal deformation axis of the adjacent slabs.

My improved joint comprises a true rigid structural truss frame having top and bottom chords and end shear members, formed to the exact cross section of the pavement slab. Intermediate web members are provided.

The chords and end shear members of the truss frame perform the vital function of making a completely continuous expansion and contraction loop with flanges embedded and anchored in the concrete, to make the joint space necessarily and absolutely water and dirt tight.

The truss frame also provides the important function of forming a protective and assembly envelope for a poured or pre-molded compressible filler material which can be inserted in the frame after it has been completely formed and galvanized. This is a great advantage over those joints which required any bending or forming after galvanizing, as any such working of the material is likely to injure the galvanizing. The filler material functions initially as a form for the concrete and permanently as a compression chamber between the adjacent edges of the slabs.

Another important feature of my invention is the provision of a joint which can be easily and cheaply made entirely out of sheet metal by the usual bending, rolling, drawing or forming operations. Since the galvanizing can be performed after the joint is completed, for economic reasons it may preferably be made of steel plates and then made non-corrosive by plating, galvanizing or painting of the completely assembled structure after it has been formed or shaped.

Other features and advantages of my invention will appear more fully as I proceed with my specification.

In that form of device embodying the features of my invention shown in the accompanying drawings, Fig. 1 is a view in side elevation of three units placed end to end across the highway; Fig. 2 is a similar view of one of the units on an enlarged scale with portions broken away; Fig. 3 is a view taken as indicated by the line 3 of Fig. 2; Fig. 4 is an enlarged view showing the anchoring ears; Figs. 5 and 6 are views showing the steps in placing the filler material inside of the joint; Fig. 7 is a top plan view; Figs. 8 and 9 are views showing the shear transfer elements carried by the joint; Fig. 10 is a top plan view above one of the shear transfer elements; Fig. 11 is a vertical section view taken through one of the shear transfer elements, as indicated by the line 11—11 of Fig. 8; Fig. 12 is a view taken as indicated by the line 12—12 of Fig. 1; Fig. 13 is a top plan view of a modified form of shear or load transfer element; Fig. 14 is a view taken as indicated by the line 14 of Fig. 13; Fig. 15 is a view in side elevation of one of the sections of the shear or load transfer element; and Fig. 16 is a similar view of the other section thereof.

In Fig. 1, I have shown three units laid end to end and extending across the entire roadway. It is obvious that one or more units may be used, depending upon the width of the roadway and the length of the unit. The entire joint, therefore, may comprise one or more units. Hereafter, in describing the invention, I shall refer to the joint as consisting of one unit. As will be seen by reference to Fig. 1, the joint comprises a substantially rectangular frame. If desired, however, obviously a slight arch, crown or camber may be given to the upper chord as desired. Also, as shown in Fig. 1, if desired, the outer ends of the outer units may be somewhat widened vertically, as indicated at $x$. In describing the invention hereafter, I shall assume that the frame is rectangular, as shown by the center unit in Fig. 1.

A side view of the joint is shown on an enlarged scale in Fig. 2. As here shown, it will be seen that the joint comprises in general a rectangular frame 10 in the form of a channel iron,—that is, having two flanges both on the same side of the web. As shown in Fig. 3, the flanges are indicated by 11 and 12, and the web by 13. It will be seen that the concave face of the frame faces inwardly at the top, bottom and ends. The flanges 11$^a$ and 12$^a$, at the bottom of the frame, are preferably made somewhat wider than those at the top, and likewise the flanges 11ᵇ and 12ᵇ at the ends are also somewhat wider than at the top.

At its inner edges, the frame is provided on each side with a continuous flange 14ᵃ, carrying perforated anchoring ears 14, the perforations therein being indicated by 15. The flange 14ᵃ forms a seal for the joint. The ears extend outwardly at both sides in a plane at right angles to the plane of the frame and serve to anchor the joint to the concrete. Similar ears are provided on the end members of the frame.

The frame is preferably made of sheet iron or steel or other suitable sheet metal and may be made by the ordinary sheet metal bending, forming or drawing operations. I preferably form the upper and lower chords and end members separately, and then weld the parts together. For example, the upper chord comprising the flanges 11, 12 and 14ᵃ, and web 13, with suitable ears 14, may be bent out of one piece of metal. The lower chord, comprising the flanges 11ᵃ, 11ᵇ, and 14ᵃ, and web 13ᵇ, with its ears 14, may similarly be formed out of a separate piece of metal. Likewise the two ends, each having the flanges 11ᵇ and 12ᵇ and web 13ᵇ, may likewise be formed out of one piece of sheet metal. In such case, the corner portions 115 may be formed on the end members, as here shown. If desired, however, it is obvious that the corner portions 115 could be formed directly on the ends of the upper and lower chords. In the construction shown, the end members are attached to the upper and lower chords by the welding 16, 16.

A particular feature of the invention is the making of the web 13 concaved inwardly to a slight extent. This gives it some springiness so that it will function in the nature of a bellows or accordion and permit considerable expansion and contraction of the joint without injury. The web 13 being concaved bends or bows inwardly when the slabs expand and thus the filler 31 will not be pushed upwardly as often happens in the old forms of joint. Likewise, as shown in Fig. 12 where the sections of the joint abut each other, since the webs 13 are concaved inwardly, they will not tend to separate the units when the slabs expand but they will merely be forced inwardly toward the filler material 70.

After the frame is completely formed, the inside is filled with a suitable molded or pre-formed compressible filler material 70. This, for example, may be some suitable spongy or compressible substance formed or molded so that it will completely fill the inside of the frame with its edges lying between the flanges 11, 12. This material may be pre-formed and inserted in the frame after the latter has been completely formed. This is of advantage because it permits the frame, which is made entirely of metal, to be galvanized or painted before the compressible material is put in place. In those joints as heretofore made, where the compressible material had to be put in place and then the frame formed or bent around it, it is obvious that the galvanizing had to be done before the last bending or forming. The compressible material is put in place by merely springing the upper and lower chords somewhat apart, as shown in Fig. 5. The compressible material may, for example, be made of three pieces, as indicated by A, B and C. When the upper and lower chords are sprung apart slightly, as shown in Fig. 5, the end pieces A and C may easily be inserted, pushed out to the ends, and then the center piece B can be inserted, and then the upper and lower chords are permitted to come together so that the frame will be entirely filled with compressible material as shown in Fig. 6.

Each of the sections or units of the joint may, for example, be about ten feet long. For example, as shown in Fig. 1, there may be three units, sections, or joints, each about ten feet long to extend entirely across a roadway about thirty feet wide.

I shall now describe the shear transfer elements. As here shown, each section of the joint is provided with six of these. They are well shown in Figs. 8, 9, 10 and 11. These include complementary overlapping tight-fitting but slidable telescopic cylinders 20 and 21. These cylinders are preferably pressed out of square pieces of sheet metal 22 and 23, respectively. The upper and lower edges of the metal plates 22 and 23 are provided with bearing members 24, 24 having horizontally extending perforated anchorage ears 24ᵃ, 24ᵃ which are preferably attached to adjacent ears 14 on the main frame in any suitable manner, as, for example, by welding 25. Inside of the telescopic member 20, is preferably provided a compressible plug 26. 27 indicates a cap over the rear side of the hole adjacent the telescopic member 21 to prevent the entry of concrete or other material therein, and 28 indicates a suitable filler member of compressible material therein.

Fig. 11 is a cross sectional view showing the joint in place. In this view, 30 indicates the concrete, and 31 indicates filler material such as tar or the like, in the crevice between adjacent slabs above the expansion joint.

The telescopic member 20 of the load transfer element is joined to the plate 22 by the curved connecting web 32. This permits some flexibility between the cylindrical element 21 and the supporting plate 22 to permit slight angular movement between the adjacent ends of the slabs without destruction to the load transfer members.

One of the important features of the invention is the provision of the shear transfer elements comprising the telescopic cylinders 20 and 21. It will be seen that the entire shear transfer element is confined within the joint space, thus reducing moment action and giving a true shear substantially at the center of the joint.

The intermediate web members 13 of the frame also perform the function of serving as load transfers or shear elements across the joint space. The channel shape of the frame distributes the load properly along the face of the concrete, the webs supplying shear resistance, and the flanges taking moment tensile and compressive stresses and providing suitable bearing on the concrete. The anchorage of the shear elements is obtained by means of the ears 14.

The compressible material A, B and C may be made of any pre-molded or poured compressible substance and, if desired, may be coated with water-proof tar, asphalt, paint, wax, or the like.

In Figs. 13–16 I have shown a modified form of shear or load transfer element in general similar to the one shown in Figs. 8–11. This element includes complementary over-lapping tight-fitting but slidable telescopic cylinders 120 and 121 corresponding in general to the cylinders 20 and 21. These cylinders are preferably pressed out of square pieces of sheet metal 122 and 123 respectively. The upper and lower edges of the metal plates 122 and 123 are provided with horizontally extending bearing members 124, 124 which are preferably attached to adjacent ears 14 on the main frame in any suitable manner, as, for example, by welding 25; and in the same manner that the bearing members 24, 24 above described, are attached. Perforations in the members 124 are indicated by 115. As here shown, bearing members have extensions 124ª to give additional anchorage in the concrete. The ends of these are bent inwardly as indicated by 124ᵇ. In the form of load transfer element here shown, each of the sections is provided with stiffening or reinforcing corrugations extending radially from the cylinders and across the anchorage ears 124. Additional vertical corrugations are provided at the sides of the telescopic cylinders. For example, as shown in Figs. 13 and 15 the convex corrugations on the cylinder 121 are indicated by 150. These extend the full length of the cylinder 121 and thence radially across the plate 123 as indicated by 150ª. At the extremities of the plate, the corrugations 150ª are continued across the ears 124 as indicated by 150ᵇ. At the sides of the cylinder 121 there are vertical stiffening corrugations on the plate 123 as indicated by 151 and these are also extended across the ears 124 as indicated by 151ª. Likewise, the cylinder 120 has concave corrugations 160 which extend radially across the plate 122 as indicated by 160ª and thence across the ear 124 as indicated by 160ᵇ. This plate also has vertical corrugations 161 at the sides of the cylinder 120 which are continued across the ear 124 as indicated by 161ª.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

The perforations 15 and 115 in the ears 14 and 124 respectively may be utilized for embracing stakes or posts to assist in holding the load transfer elements and joints attached thereto in place during the pouring of the concrete. This is shown, for example, in Figs. 13 and 14 in which such a stake 190 is shown. This stake is here shown made of sheet metal semi-circular in cross-section adapted to fit snugly in the holes 115. 190ª indicates an ear bent out of the stake to engage the upper surface of the load transfer element to limit the downward driving of the stake. When the joint is put in place a plurality of such stakes are driven through the holes of the ear of the load transfer element to hold the joint in position. The stakes are driven deep enough into the ground to hold the stakes squarely against displacement when the concrete is poured.

It is to be noted that the expansion joint comprises a transverse (of the roadway) truss including top and bottom channel chords connected at intervals by struts (the plates 22 and 23). The plates are provided with horizontally-extending ears 24, 24 welded to adjacent ears 14 on the main frame or truss. See page 2, column 2, lines 12 to 32 of this specification. This makes a truss that is strong and rigid transversely of the roadway. This truss, however, is expansible and contractible transversely of itself, that is, in a direction longitudinal with the roadway because of the channel formation and the concavities in the webs 13. The whole device therefore may be called an expansion truss. That is, it forms a truss across the roadway while at the same time forming an expansion joint in the direction of the roadway. Moreover, the entire expansion truss is sealed against entrance of objectionable foreign matter. This is accomplished by providing on each side of the main frame or channel the continuous horizontal flange 14ª. This forms a seal for the entire joint on each side. Besides this, the plates 22 and 23 forming the struts between the upper and lower chords of the truss also serve the function of carrying the telescoping cylinders 20 and 21 of relatively large diameter which comprise the load transfer elements. Moreover, the shear points of these two telescoping cylinders lie entirely within the limits of the truss (lengthwise of the roadway) and substantially in the central vertical plane of the truss. This is of great advantage because in such constructions the load imposed upon the load transfer is substantially vertical and without any bending or warping strain.

It is to be noted that the load transfer units as best shown in Figs. 8–11 and 13–16 are all structural forms lying horizontally, that is channels, with the flanges horizontal, and those of each extending in opposite directions. The webs of the channels are provided with the tubular or cylindrical telescoping shear members. In these devices the flanges of the channels adjacent the webs serve as bearing members therefor and the extensions or extremities of the channels provided with the holes serve as anchors. The channels, as described above, have their upper and lower flanges attached to the upper and lower chords of the truss of the expansion joint, respectively, and serve as struts therefor. In Figs. 8–11 the flanges of the channels, constituting the bearing elements, adjacent the webs are indicated by 24 and the extensions on said flanges serving as the anchors are indicated by 24ª. These anchors are provided with the perforations 24ᵇ in order to anchor the elements in the concrete slabs. In Figs. 9 and 11, 22 and 23 indicate the webs of the opposite channels forming the load transfer elements. In the device of Figs. 13–16 the similar flanges of the channels serving as bearing members are indicated by 124 and the extensions thereon serving as the anchors are indicated by 124ª.

It is to be noted also that the tubular telescoping shear members 20, 21 and 120, 121 are relatively short so that the load on said members lies substantially entirely within the joint space. When the load transfer units are embedded in adjacent concrete slabs as shown in Fig. 11, it will be seen that the telescoping members lie substantially midway between the top and bottom of the slab, that is substantially on the neutral axis. The bearing members and anchors are relatively close to the top and bottom of the slabs. It is to be noted also that the telescoping tubular members are relatively short so that a slight bending or hinge action between the ends of the slabs is permitted although the adjacent ends are still held in registry by the load transfer element. As here shown, the length of the telescoping cylinders 20, 21 and 120, 121 is somewhat less than the diameter thereof.

I claim:

1. An expansion joint structure, comprising: two parallel inwardly directed, flexible, channel members, each provided with outwardly extending flanges; shear members extending between and secured to said flanges at spaced intervals along their length, each of said shear members comprising a pair of spaced web plates provided with tubular members of substantial diameter extending into the space between the web plates and telescoping each other, one of said web plates being provided with a closure to exclude concrete from the tubular telescopic connection to provide space for telescopic movement upon expansion and contraction.

2. A structure as claimed in claim 1 with a web of compressible material having its edges covered by said channel members, said web having a thickness to substantially fill the space between the web plates of each shear member.

3. A structure as claimed in claim 1 in which the flexibility of each channel member is accomplished by providing a flexible connection between the legs of the channel member, said flexible connection constituting a common chord for the adjacent chords formed by the leg and flange of each channel.

4. A structure as claimed in claim 1 in which the flanges of the channel members are provided with extensions serving as anchors.

5. A structure as claimed in claim 1 in which the web plates are provided with flanges at the top and bottom, said flanges being attached to the flanges of the channel members.

6. A shear member, comprising: a pair of spaced plates provided with tubular members of substantial diameter extending into the space between the plates and telescoping each other, one of said plates being provided with a closure to exclude concrete from the tubular telescopic connection to provide space for telescopic movement upon expansion and contraction.

7. A device as claimed in claim 6 in which the length of the telescoping tubular members is less than one-half of their diameter.

8. A device as claimed in claim 6, in which the spaced plates are provided with flanges at the top and bottom.

9. A device as claimed in claim 6, in which the spaced plates are provided with flanges at the top and bottom and in which the diameter of the telescoping tubular members is greater than one-quarter of the distance between said flanges.

10. A device as claimed in claim 6, in which the spaced plates are provided with outwardly extending flanges at the top and bottom, said flanges having extensions serving as anchors.

JACOB R. SENSIBAR.